United States Patent
Araya

(10) Patent No.: US 9,250,842 B2
(45) Date of Patent: Feb. 2, 2016

(54) IMAGE FORMING APPARATUS PROCESSING A PLURALITY OF PAGES IN PARALLEL

(71) Applicant: KYOCERA Document Solutions Inc., Osaka (JP)

(72) Inventor: Takeshi Araya, Osaka (JP)

(73) Assignee: KYOCERA Document Solutions Inc. (JP)

( * ) Notice: Subject to any disclaimer, the term of this patent is extended or adjusted under 35 U.S.C. 154(b) by 236 days.

(21) Appl. No.: 14/103,983

(22) Filed: Dec. 12, 2013

(65) Prior Publication Data

US 2014/0168700 A1 Jun. 19, 2014

(30) Foreign Application Priority Data

Dec. 13, 2012 (JP) ................................. 2012-272812

(51) Int. Cl.
*G06F 13/10* (2006.01)
*G06F 3/12* (2006.01)

(52) U.S. Cl.
CPC .............. *G06F 3/124* (2013.01); *G06F 3/1215* (2013.01); *G06F 3/1247* (2013.01); *G06F 3/1279* (2013.01)

(58) Field of Classification Search
CPC ........ G06F 13/18; G06F 3/124; G06F 3/1247
See application file for complete search history.

(56) References Cited

U.S. PATENT DOCUMENTS 6,704,847 B1 * 3/2004 Six ......................... G06F 13/18
455/403

FOREIGN PATENT DOCUMENTS

| JP | 10-040040 A | 2/1998 |
| JP | 2012-000778 A | 1/2012 |

\* cited by examiner

*Primary Examiner* — Jae Yu
(74) *Attorney, Agent, or Firm* — McDonell Boehnen Hulbert & Berghoff LLP

(57) ABSTRACT

An image forming apparatus includes a data storage unit, a plurality of data processing units, and an assignment unit. The data storage unit is configured to store data of pages onto a plurality of storage devices. The plurality of data processing units are configured to perform parallel processing on the data of the pages, wherein the data for each of the pages is assigned to one of the plurality of data processing units. The assignment unit is configured to assign the data of each of the pages to be processed by one of the plurality of data processing units, wherein the assignment of the data of each of the pages to one of the plurality of data processing units is determined by a transfer rate of each of the storage devices for the data of the pages stored on the plurality of storage devices.

9 Claims, 15 Drawing Sheets

| PRIORITY | STORAGE DEVICE | SERIAL NUMBER | TRANSFER RATE (MB/s) | NETWORK | SERVER NAME | IP ADDRESS | PROTOCOL |
|---|---|---|---|---|---|---|---|
| 1 | RAM Disk | aaaaaaaa | 16000 | NO | - | - | - |
| 2 | SSD | bbbbbbbb | 300 | NO | - | - | - |
| 3 | HDD | cccccccc | 150 | NO | - | - | - |

FIG. 3

|  | PROCESSING STATUS | PROCESSING PAGE | REFERENCE STORAGE DEVICE |
|---|---|---|---|
| FIRST DATA PROCESSING SECTION | 0 | — | — |
| SECOND DATA PROCESSING SECTION | 0 | — | — |
| THIRD DATA PROCESSING SECTION | 0 | — | — |

FIG. 8A

|  | PROCESSING STATUS | PROCESSING PAGE | REFERENCE STORAGE DEVICE |
|---|---|---|---|
| FIRST DATA PROCESSING SECTION | 0 | 1-10 | — |
| SECOND DATA PROCESSING SECTION | 0 | — | — |
| THIRD DATA PROCESSING SECTION | 0 | — | — |

FIG. 8B

|  | PROCESSING STATUS | PROCESSING PAGE | REFERENCE STORAGE DEVICE |
|---|---|---|---|
| FIRST DATA PROCESSING SECTION | 0 | 1-10 | 1-3 |
| SECOND DATA PROCESSING SECTION | 0 | — | — |
| THIRD DATA PROCESSING SECTION | 0 | — | — |

FIG. 8C

|  | PROCESSING STATUS | PROCESSING PAGE | REFERENCE STORAGE DEVICE |
|---|---|---|---|
| FIRST DATA PROCESSING SECTION | 1 | 1-10 | 1-3 |
| SECOND DATA PROCESSING SECTION | 0 | — | — |
| THIRD DATA PROCESSING SECTION | 0 | — | — |

FIG. 8D

|  | PROCESSING STATUS | PROCESSING PAGE | REFERENCE STORAGE DEVICE |
|---|---|---|---|
| FIRST DATA PROCESSING SECTION | 1 | 1-10 | 1-3 |
| SECOND DATA PROCESSING SECTION | 1 | 2-10 | 2-3 |
| THIRD DATA PROCESSING SECTION | 1 | 3-10 | 3-3 |

FIG. 10

| 1 : SPOOL TO FIRST STORAGE DEVICE |
| --- |
| 1.4 : COPY TO SECOND STORAGE DEVICE |
| 1.2 : COPY TO THIRD STORAGE DEVICE |

| FIRST STORAGE DEVICE | SECOND STORAGE DEVICE | THIRD STORAGE DEVICE |
| --- | --- | --- |
| 1 (FIRST PAGE) | 1 (THIRD PAGE) | 1 (SECOND PAGE) |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 1 (FOURTH PAGE) | 9 | 9 |
| 2 | 10 | 10 |
| 3 | 11 | 11 |
| 4 | 12 | 12 |
| 5 | 13 | 1 (FIFTH PAGE) |
| 6 | 14 | 2 |
| 7 | 15 | 3 |
| 8 | 16.8 | 4 |
| 9 | | 5 |
| 10 | | 6 |
| 11 | | 7 |
| 12 | | 8 |
| 13 | | 9 |
| 14 | | 10 |
| | | 11 |
| | | 12 |
| | | 13 |
| | | 14 |
| | | 15 |
| | | 16 |
| | | 17 |
| | | 18 |
| | | 19.2 |

FIG. 11

| 1 : SPOOL TO FIRST STORAGE DEVICE |
| 1.4 : COPY TO SECOND STORAGE DEVICE |
| 1.2 : COPY TO THIRD STORAGE DEVICE |

| FIRST STORAGE DEVICE | SECOND STORAGE DEVICE | THIRD STORAGE DEVICE |
|---|---|---|
| 1 (FIRST PAGE) | 1 (SECOND PAGE) | 1 (THIRD PAGE) |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 1 (FOURTH PAGE) | 9 | 9 |
| 2 | 10 | 10 |
| 3 | 11 | 11 |
| 4 | 12 | 12 |
| 5 | 13 | 13 |
| 6 | 14 | 14.4 |
| 7 | 1 (FIFTH PAGE) | |
| 8 | 2 | |
| 9 | 3 | |
| 10 | 4 | |
| 11 | 5 | |
| 12 | 6 | |
| 13 | 7 | |
| 14 | 8 | |
| | 9 | |
| | 10 | |
| | 11 | |
| | 12 | |
| | 13 | |
| | 14 | |
| | 15 | |
| | 16 | |
| | 17 | |
| | 18 | |
| | 19 | |
| | 20 | |
| | 21 | |
| | 22.4 | |

FIG. 12

| PRIORITY | STORAGE DEVICE | SERIAL NUMBER | TRANSFER RATE (MB/s) | NETWORK | SERVER NAME | IP ADDRESS | PROTOCOL |
|---|---|---|---|---|---|---|---|
| 1 | RAM Disk | aaaaaaaa | 16000 | NO | - | - | - |
| 2 | SSD | bbbbbbbb | 300 | NO | - | - | - |
| 3 | HDD | cccccccc | 150 | NO | - | - | - |
| 4 | Server HDD | dddddddd | 50 | YES | DDDD | XXX.XXX.XXX.XXX | SMB |

FIG. 14

IMAGE FORMING APPARATUS PROCESSING A PLURALITY OF PAGES IN PARALLEL

RELATED APPLICATIONS

This application claims priority to Japanese Patent Application No. 2012-272812, filed in the Japan Patent Office on Dec. 13, 2012, the entire contents of which are incorporated herein by reference.

FIELD

The present disclosure relates to an image forming apparatus that performs processing on different pages of data for a plurality of pages in parallel.

BACKGROUND

A typical image forming apparatus using a multi-core processor performs parallel analysis processing of data having a page description language (PDL) format including a plurality of pages by assigning different pages to respective cores.

For example, the typical image forming apparatus stores data of a plurality of pages on a plurality of storage devices, and assigns a page to be subjected to analysis processing and a storage device to be used with the analysis processing to each of the plurality of cores.

With this configuration, the typical image forming apparatus can perform analysis processing of data from different pages in parallel.

However, the typical image forming apparatus simply assigns a page to be subjected to the analysis processing to each core, and hence overall processing time may become long depending on a transfer rate of the storage device.

SUMMARY

An image forming apparatus according to one embodiment of the present disclosure includes a data storage unit, a plurality of data processing units, and an assignment unit. The data storage unit is configured to store data of a plurality of pages onto a plurality of storage devices. The plurality of data processing units are configured to perform parallel processing on the data of the plurality of pages, wherein the data for each of the pages is assigned to one of the plurality of data processing units. The assignment unit is configured to assign the data of each of the pages to be processed by one of the plurality of data processing units, wherein the assignment of the data of each of the pages to one of the plurality of data processing units is determined by a transfer rate of each of the storage devices for the data of the plurality of pages stored on the plurality of storage devices.

A non-transitory computer-readable recording medium according to one embodiment of the present disclosure has stored thereon an image processing program executable by a computer of an image processing apparatus. The image processing program includes first to third program codes. The first program code causes the computer to store data of a plurality of pages onto a plurality of storage devices. The second program code causes the computer to realize a plurality of data processing functions that perform parallel processing on the data of the plurality of pages, wherein the data of each of the plurality of pages is assigned to one of the plurality of data processing functions. The third program code causes the computer to assign the data of each of the pages to be processed in parallel by one of the plurality of data processing functions, wherein the assigned of the data of each of the pages to be processed in parallel by one of the plurality of data processing functions is determined by a transfer rate of each of the storage devices for the data of the plurality of pages stored on the plurality of storage devices.

An image forming method according to one embodiment of the present disclosure includes: (i) storing, via a data storage unit, data of a plurality of pages onto a plurality of storage devices. The image forming method also includes performing, via a plurality of data processing units, parallel processing on the data of the plurality of pages, wherein the data for each of the pages is assigned to one of the plurality of data processing units. The image forming method further includes assigning, via an assignment unit, the data of each of the pages to be processed by one of the plurality of data processing units, wherein the assignment of the data of each of the pages to one of the plurality of data processing units is determined by a transfer rate of each of the storage devices for the data of the plurality of pages stored on the plurality of storage devices.

These as well as other aspects and advantages will become apparent to those of ordinary skill in the art by reading the following detailed description with reference where appropriate to the accompanying drawings. Further, it is understood that this summary is merely an example and is not intended to limit the scope of the invention as claimed.

BRIEF DESCRIPTION OF THE DRAWINGS

All drawings are intended to illustrate some aspects and examples of the present disclosure. The drawings described are only schematic and are non-limiting, and are not necessarily drawn to scale.

FIG. 3 shows an example of a priority table according to the first embodiment of the present disclosure.

FIG. 8A to FIG. 8D show an example of how a processing status table is set.

FIG. 10 shows an example of the processing status table after the setting.

FIG. 11 illustrates processing time required for analysis processing according to the one embodiment of the present disclosure.

FIG. 12 illustrates processing time required for the analysis processing according to a comparative example.

FIG. 14 shows an example of a priority table according to the second embodiment of the present disclosure.

DETAILED DESCRIPTION

Embodiments of the present disclosure are described with reference to the accompanying drawings. It should be understood, however, that numerous variations from the depicted arrangements and functions are possible while remaining within the scope and spirit of the claims. Where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software.

I. First Embodiment

Figure 1:
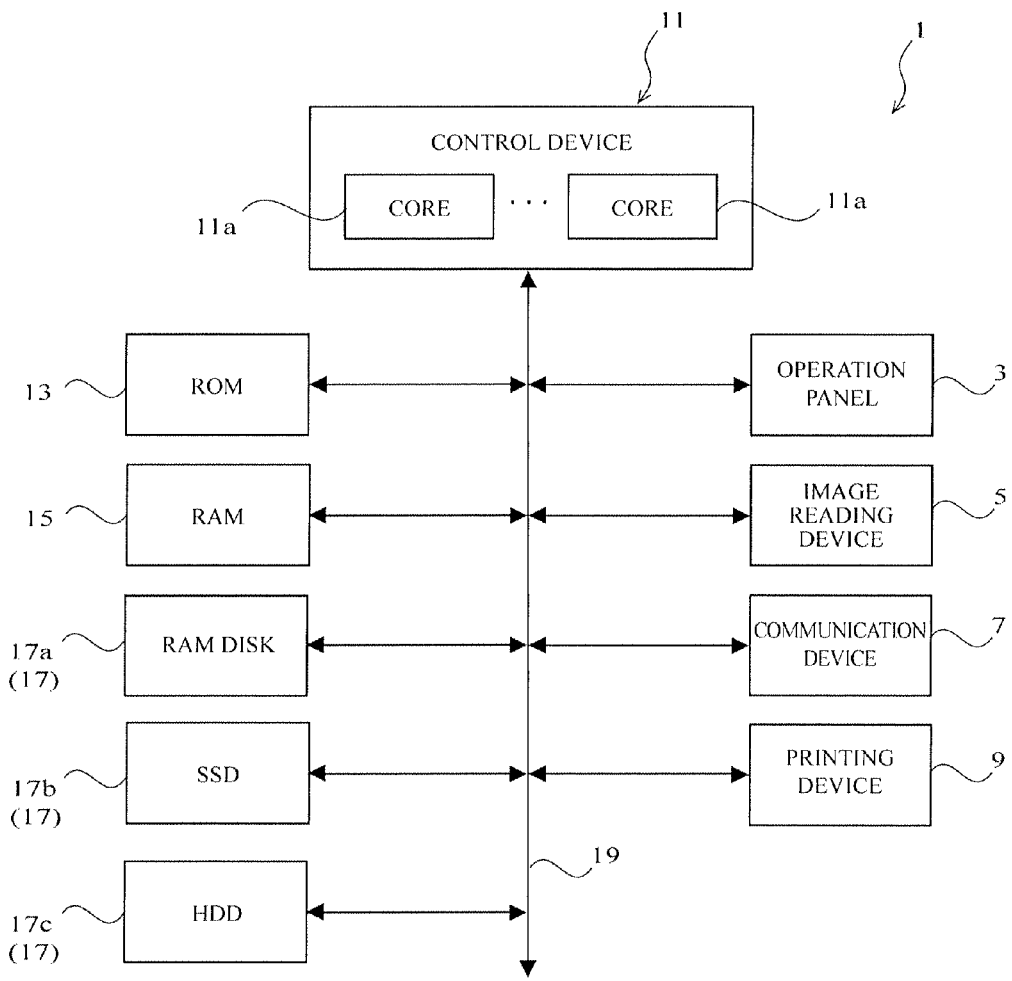
FIG. 1 illustrates a configuration of an image forming apparatus according to a first embodiment of the present disclosure.

FIG. 1 illustrates a configuration of an image forming apparatus according to the first embodiment of the present disclosure.

An image forming apparatus 1 illustrated in FIG. 1 may include, for example, a copier, a printer, or a digital multifunction peripheral, and can have a copy function and/or a print function. The copy function outputs a print of an image read from an original document, and the print function outputs a print of an image based on job data input via a network or the like.

The image forming apparatus 1 includes an operation panel 3, an image reading device 5, a communication device 7, a printing device 9, a control device 11, read only memory (ROM) 13, random access memory (RAM) 15, and a plurality of storage devices including a RAM disk 17a, a solid-state drive (SSD) 17b, and a hard disk drive (HDD) 17c. The devices included in image forming apparatus 1 are connected to each other through a bus 19.

The operation panel 3 may include a crystal display screen with a touch panel, which displays an operation input for and an operation status of the image forming apparatus 1.

The image reading device 5 may include a scanner, and reads an original image in response to an instruction input or the like performed through the operation panel 3 to output image data corresponding the scanned original image.

The communication device 7 transmits data to and receives data from an external terminal, such as a user terminal, via a network, such as a LAN.

The printing device 9 forms an image on paper based on image data read by the image reading device 5 or job data transmitted from an external terminal.

The control device 11 performs control or the like for the operation panel 3, the image reading device 5, the communication device 7, and the printing device 9 to realize the copy function or the print function. The control device 11 according to the first embodiment includes a multicore processor, wherein a plurality of cores 11a serving as arithmetic operation units are integrated within one package. Note that the control device 11 may be a plurality of CPUs in place of a plurality of cores.

The ROM 13 is memory that stores a program or the like. The RAM 15 is memory that temporarily stores, when the program is executed, the program and various kinds of data and is used as a work memory or the like.

The RAM disk 17a can be used in the same manner as an HDD or the like by using a part of the RAM 15. The SSD 17b and the HDD 17c are nonvolatile storage media that can be read to and written from. The RAM disk 17a, the SSD 17b, and the HDD 17c are provided to a control board or the like in a nonremovable manner in the first embodiment.

The RAM disk 17a, the SSD 17b, and the HDD 17c may be hereinafter collectively referred to as "storage devices 17" that can be used independently of one another.

Figure 2:
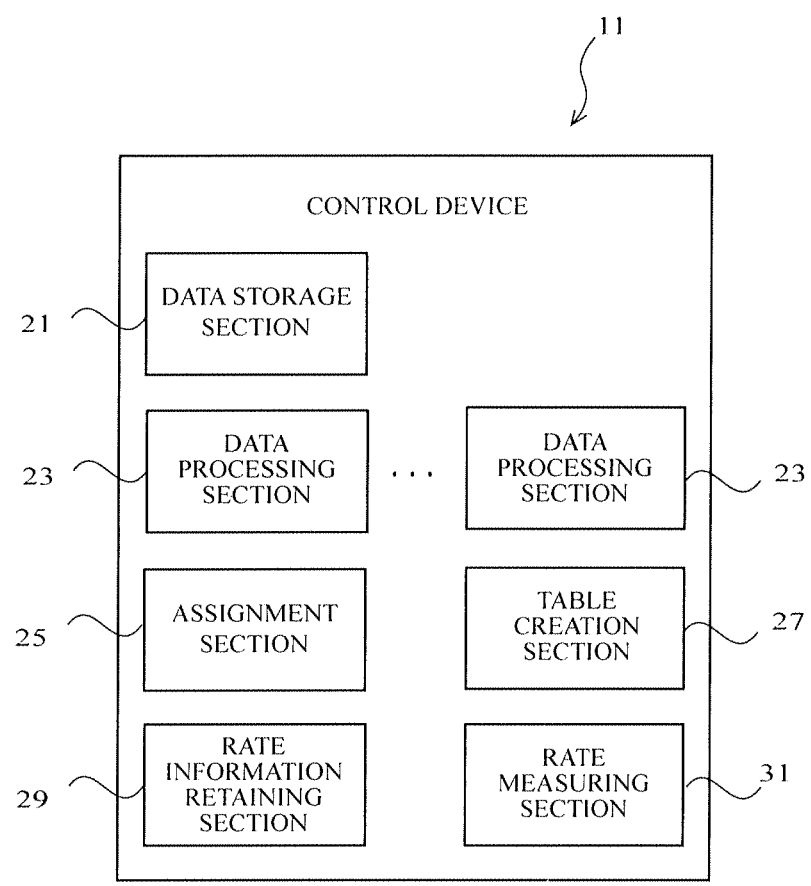
FIG. 2 illustrates a configuration of a control unit illustrated in FIG. 1.

FIG. 2 illustrates a configuration of the control device illustrated in FIG. 1.

In the first embodiment, the control device 11 executes an image forming program stored in the ROM 13. As a result, control device 11 acts as a data storing section 21, a plurality of data processing sections 23, an assignment section 25, a table creation section 27, a rate information retaining section 29, and a rate measuring section 31. With those functions, analysis processing of different pages is performed for job data of a plurality of pages in parallel (parallel processing).

Note that, in the first embodiment, the plurality of cores 11a of the control device 11 functions as the data processing sections 23, and one of the cores 11a further functions as the data storage section 21, the assignment section 25, the table creation section 27, the rate information retaining section 29, and the rate measuring section 31.

The data storing section 21 implements a data storing function, and stores the input job data of a plurality of pages onto storage devices 17. Specifically, the job data is stored (spooled) onto storage devices 17 if there are more than one available cores 11a (data processing sections 23), more than one available storage devices 17, and more than one pages that form the job data.

The job data is stored until the number of storage devices 17 that store the job data becomes greater than or equal to the number of available cores 11a (data processing sections 23) or becomes greater than or equal to the number of pages that form the job data, even if the number of storage devices 17 that store the job data is smaller than the number of available cores.

The data processing section 23 implements a data processing function, and performs the analysis processing of different pages for job data within the plurality of storage devices 17 in parallel. The analysis processing is performed based on assignment performed by the assignment section 25.

In the analysis processing, the job data, such as PDL data, is interpreted, and intermediate data is generated. Bitmap data is generated from the intermediate data, and the bitmap data is output to the printing device 9 to be used to output the bitmap onto the paper.

Note that a description is made by assuming that an output destination of the bitmap data is the printing device 9 in the first embodiment, but the first disclosure is not limited thereto. For example, an image based on the bitmap data may be displayed with the output destination set as the operation panel 3.

The assignment section 25 implements an assignment function, and assigns a page to be processed for each piece of job data within the plurality of storage devices 17 to the data processing section 23. In the first embodiment, the page to be processed is assigned to the data processing section 23 in advance, and the storage device from the plurality of storage devices 17 is further assigned to the data processing section 23.

Note that the storage device from the plurality of storage devices 17 can also be assigned to the data processing section 23 in advance. In this case, the assignment of the storage device from the plurality of storage devices 17 to the data processing section 23 becomes unnecessary, and the storage device from the plurality of storage devices 17 can also be assigned the page to be processed corresponding to each data processing section 23.

The assignment of the storage device according to the first embodiment is performed in accordance with a transfer rate. Specifically, the storage devices 17 are preferentially assigned in descending order of the transfer rate to the data processing sections 23 to which the pages to be processed have been assigned.

For example, when pages are output in ascending order of a page number, the storage devices 17 can be assigned to the data processing section 23 that processes the page given the smaller page number in descending order of the transfer rate of the storage device from the plurality of storage devices 17.

In the assignment, a priority table created by the table creation section 27 is used.

The table creation section 27 acquires transfer rate information on the available storage devices 17, and creates the priority table where a higher priority is given to the storage device from the plurality of storage devices 17 having a higher transfer rate. The transfer rate information is acquired from the rate information retaining section 29 and the rate measuring section 31.

The rate information retaining section 29 implements a rate information retaining function, and retains known transfer rates of the plurality of storage devices 17 as program data.

For example, the RAM disk 17a, the SSD 17b, and the HDD 17c (storage devices 17) are provided to the image forming apparatus 1 in a nonremovable manner, and hence the transfer rates thereof are known. Those known transfer rates are retained as program data by the rate information retaining section 29.

The rate measuring section 31 implements a rate measuring function. In the analysis processing, rate measuring section 31 measures the transfer rate of the storage device from the plurality of storage devices 17 whose transfer rate information is not already retained.

In a case where, for example, an attachable external storage medium such as a USB flash memory device is newly connected, the transfer rate is unknown. Therefore the rate measuring section 31 measures the unknown transfer rate of the newly connected USB flash memory device.

The table creation section 27 creates the priority table based on the transfer rates obtained from the rate information retaining section 29 and the rate measuring section 31. FIG. 3 shows an example of the priority table according to the first embodiment of the present disclosure.

In the priority table shown in FIG. 3, the priority corresponding to the transfer rate is given to the storage device 17. In FIG. 3, the transfer rates of the RAM disk (RAM Disk) 17a, the SSD 17b, and the HDD 17c are "16,000 MB/s", "300 MB/s", and "150 MB/s", respectively; hence, priorities "1", "2", and "3" corresponding to the transfer rates are given to the RAM disk 17a, the SSD 17b, and the HDD 17c, respectively.

The priority table is stored in a nonvolatile storage device such as the SSD 17b or the HDD 17c after it is created, and is used for the analysis processing.

In one case, the priority table with predetermined priorities and transfer rates is used. In another case, the priority table is updated based on the storage devices 17 that are available when the analysis processing is started.

The priority table is updated when the available storage devices 17 have increased or decreased in number since the creation of the priority table. If a new storage device is added, the priority table is reconfigured to add the new device, measure its transfer rate, and update the priorities. If a storage device is removed or unavailable, the priority table is configured to remove that device from the priority table and update the priorities.

Updating the priority table can also be performed by the table creation section 27 based on the transfer rates obtained from the rate information retaining section 29 and the rate measuring section 31.

Figure 4:
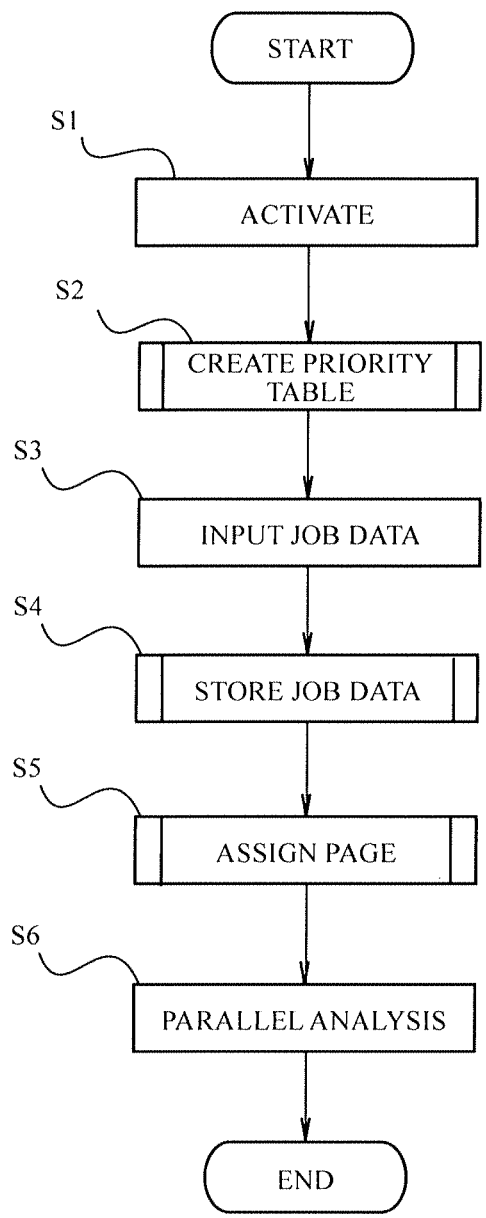
FIG. 4 illustrates a procedure for a parallel processing performed by the image forming apparatus illustrated in FIG. 1.

FIG. 4 illustrates a procedure for a parallel processing procedure performed by the image forming apparatus illustrated in FIG. 1.

The parallel processing according to the first embodiment begins when power is supplied to the image forming apparatus 1. The analysis processing of the different pages is performed for the job data for the plurality of pages in parallel in accordance with a flowchart illustrated in FIG. 4. Here, the description is made on the assumption that the job data includes a plurality of pages.

In step S1, the control device 11 is activated, initiating a processing standby state for the job data, and the procedure advances to step S2.

Note that the data processing sections 23 are active until the number of data processing sections 23 reaches the number of available cores 11a of the control device 11. As a result, tasks for executing the data processing sections 23 whose number corresponds to the number of cores are set.

For example, when the control device 11 includes four cores, four tasks for executing the data processing sections 23 are set. Note that the sections other than the data processing section 23 are executed by one of the plurality of cores 11a included in the control device 11.

In step S2, the table creation section 27 of the control device 11 creates the priority table. When step S2 is completed, the procedure advances to step S3.

In step S3, the job data of the plurality of pages are input to the control device 11 via the network or the like. When step S3 is completed, the procedure advances to step S4.

In step S4, the data storing section 21 of the control device 11 copies and stores the input job data of the plurality of pages onto the plurality of storage devices 17. When step S4 is completed, the procedure advances to step S5.

In step S5, the assignment section 25 of the control device 11 assigns the page to be processed to the data processing section 23 for each piece of data within the plurality of storage devices 17 in accordance with the transfer rates based on the priority table. When step S5 is completed, the procedure advances to step S6.

In step S6, the data processing sections 23 of the control device 11 perform the analysis processing of the different pages for the job data within the plurality of storage devices 17 in parallel.

When the parallel processing of FIG. 4 is completed, data having a bitmap format is generated and sent to the printing device 9 to be printed onto paper.

Figure 5:
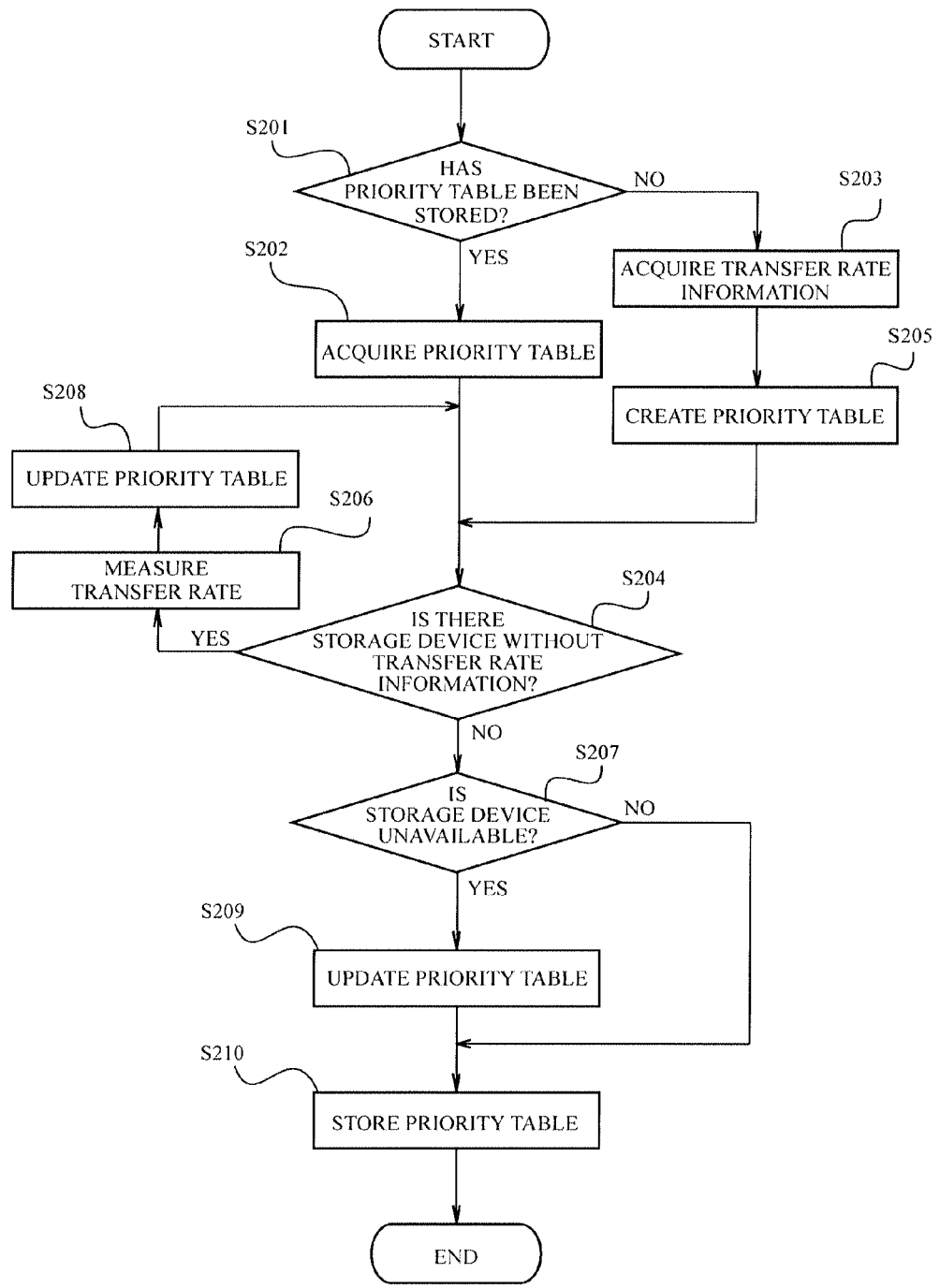
FIG. 5 illustrates a procedure for creation processing for the priority table shown in FIG. 3.

FIG. 5 illustrates a procedure for creation processing for the priority table shown in FIG. 3. Note that, in the first embodiment, the creation processing of the priority table is performed as initial processing. Alternatively, the creation processing of the priority table is performed immediately before the page assignment processing illustrated in FIG. 4.

In the creation processing of the priority table, first in step S201, the table creation section 27 determines whether or not a priority table has been stored in the nonvolatile storage device such as the SSD 17b and the HDD 17c. The stored priority table is created by the former processing.

If a priority table has been stored (Yes), the procedure advances to step S202, and otherwise (No), the procedure advances to step S203.

In step S202, the table creation section 27 acquires the stored priority table from the nonvolatile storage device such as the SSD 17b or the HDD 17c, and the procedure advances to step S204.

On the other hand, in step S203, the table creation section 27 acquires the transfer rate information on each of the storage devices 17 from the program data, and the procedure advances to step S205.

In step S205, the table creation section 27 creates the priority table based on the acquired transfer rate information.

Therefore, in step S205, the priority table is created based on only the known transfer rates. When step S205 is completed, the procedure advances to step S204.

In step S204, the table creation section 27 determines whether or not there is a storage device having no transfer rate information in the priority table acquired in step S202 or created in step S205.

A storage device having no transfer rate information may be, for example, an external storage medium such as a USB flash memory device newly connected to the image forming apparatus 1, and does not have the transfer rate information retained as the program data, but is available.

If there is a storage device having no transfer rate information in the assignment priority table (Yes), the procedure advances to step S206, and otherwise (No), the procedure advances to step S207.

In step S206, the rate measuring section 31 of the control device 11 measures the transfer rate of the storage device having no transfer rate information in the priority table, and the procedure advances to step S208.

In step S208, the priority table is updated based on the measured transfer rate information. After the priority table has been updated, the transfer rate information on the storage device that has not been included in the priority table is added.

When step S208 is completed, the procedure returns to step S204. With this loop, the processing is repeated until the transfer rate information on all the available storage devices is added to the priority table, and the procedure advances to step S207.

In step S207, the table creation section 27 determines whether or not the storage device corresponding to transfer rate information in the priority table is unavailable.

For example, when an external storage medium such as a USB flash memory device is removed, the external storage medium becomes unavailable, but its transfer rate information may still be stored in the priority table acquired in step S202.

Therefore, in step S207, it is determined whether or not the transfer rate information on those unavailable storage devices remains in the priority table.

If there is transfer rate information on an unavailable storage device in the priority table (Yes), the procedure advances to step S209, and otherwise (No), the procedure advances to step S210.

In step S209, the table creation section 27 updates the priority table by deleting the transfer rate information on the unavailable storage device.

When step S209 is completed, the procedure advances to step S210.

In step S210, when the priority table as shown in FIG. 3 is created through the above-mentioned steps, the table creation section 27 stores the priority table onto the nonvolatile storage device (for example, the SSD 17b or HDD 17c).

When step S210 is completed, the table creation processing is brought to an end.

Figure 6:
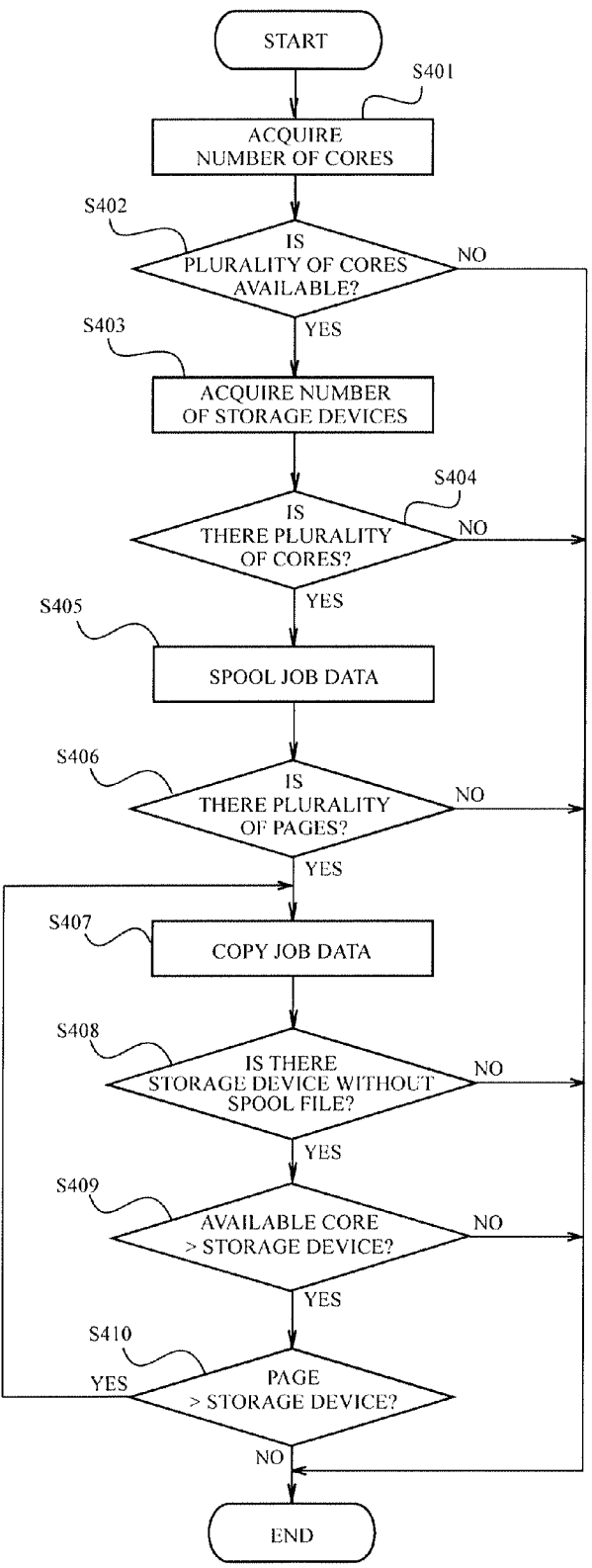
FIG. 6 illustrates a procedure for storage processing for job data illustrated in FIG. 4.

FIG. 6 illustrates a procedure for storage processing for the job data illustrated in FIG. 4.

In step S401, the number of cores available for the analysis processing of the job data among the plurality of cores 11a that form the control device 11 is acquired.

The number of cores can be acquired from, for example, a task for managing an operating status of the core 11a or a table showing a use status. The table showing the use status may be, for example, a table where data indicating the use status of each of the plurality of cores that form the control device 11 is stored and updated. The table showing the use status may be provided in an area set within the RAM 15.

When step S401 is completed, the procedure advances to step S402.

In step S402, it is determined whether there are at least two available cores.

If there are at least two available cores (Yes), the procedure advances to step S403. If the number of available cores is less than or equal to one (No), the job data storage processing is brought to an end.

Note that, when the job data storage processing is brought to an end, normal analysis processing is executed in accordance with a language used for the job data. For example, the analysis processing is executed for job data in a format that needs to be spooled (for example, Portable Document Format (PDF) or XML Paper Specification (XPS)) after the job data is spooled onto any one of the storage devices 17. For job data in a format that does not need to be spooled (PostScript (PS), Printer Command Language (PCL), or the like), the analysis processing is executed in order.

In step S403, the number of storage devices 17 included in the image forming apparatus 1 is acquired, and the procedure advances to step S404.

In step S404, it is determined whether or not there are at least two storage devices 17.

If there are at least two storage devices 17 (Yes), the procedure advances to step S405. If the number of storage devices 17 is less than or equal to one (No), the job data storage processing is brought to an end. Note that, when the job data storage processing is brought to an end, the procedure advances to the normal analysis processing in the same manner as in the case of step S402.

In step S405, the job data is spooled onto any one of the plurality of storage devices 17, and the procedure advances to step S406.

In step S406, it is determined whether or not there are at least two pages that form the spooled job data. For example, when the job data is in the PS format, the determination of the number of pages can be performed by a search using a "show-page" command.

If the number of pages is greater than or equal to two (Yes), the procedure advances to step S407. If the number of pages is less than or equal to one (No), the job data storage processing is brought to an end and the procedure advances to the normal analysis processing.

In step S407, the job data that has been spooled onto one of the storage devices 17 (spool file) is copied and stored onto another one of the storage devices 17. When step S407 is completed, the procedure advances to step S408.

In step S408, it is determined whether or not there is a storage device in the plurality of storage devices 17 where spool file is not stored.

If there is a storage device in the plurality of storage devices 17 where spool file is not stored (Yes), the procedure advances to step S409. If there is no storage device within the plurality of storage devices 17 where spool file is not stored (No), the job data storage processing is brought to an end and the procedure advances to step S5 of FIG. 4.

In step S409, it is determined whether or not the number of available cores is greater than the number of storage devices 17 that store the spool file (storage devices 17 in use).

If the number of available cores is larger than the number of storage devices 17 in use (Yes), the procedure advances to step S410. If the number of available cores is equal to or smaller than the number of storage devices 17 in use (No), the job data storage processing is brought to an end and the procedure advances to step S5 of FIG. 4.

In step S410, it is determined whether or not the number of pages of the job data is larger than the number of storage devices 17 in use.

If the number of pages is larger than the number of storage devices 17 in use (Yes), the procedure returns to step S407. If the number of pages is less than or equal to the number of storage devices 17 in use (No), the job data storage processing is brought to an end and the procedure advances to step S5 of FIG. 4.

In this manner, the job data is stored on all the available storage devices 17.

Figure 7:
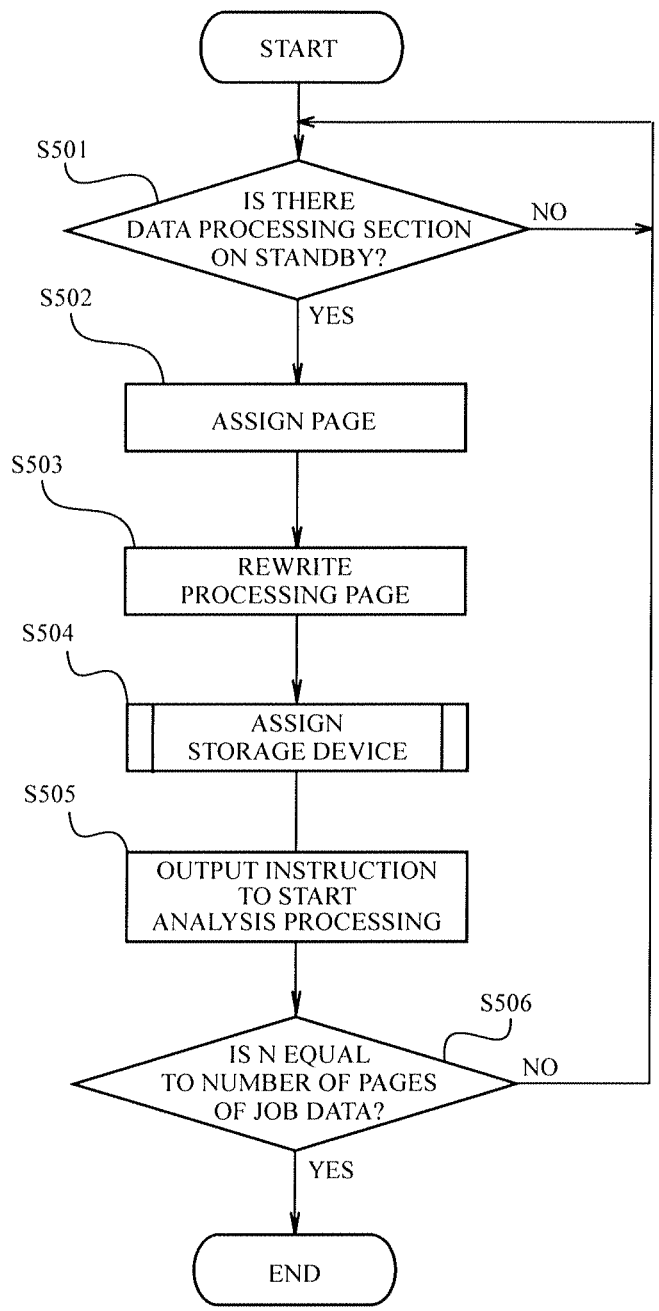
FIG. 7 illustrates a procedure for page assignment processing illustrated in the flowchart of FIG. 4.

FIG. 7 illustrates a procedure for the page assignment processing illustrated in the flowchart of FIG. 4.

In the page assignment processing according to the first embodiment, the page to be processed is assigned to the plurality of data processing sections 23 in advance, and each storage device from the plurality of storage devices 17 is assigned to each data processing section 23.

First, in step S501, it is determined whether or not there is a data processing section 23 that has not executed the analysis processing. If there is a data processing section 23 on standby (Yes), the procedure advances to step S502, and otherwise (No), the procedure returns to step S501.

The determination in step S501 is performed with reference to a processing status table for the data processing section 23. FIG. 8A to FIG. 8D show an example of how the processing status table is set. Note that, in FIG. 8A to FIG. 8D, a case of including first to third data processing sections is taken as an example.

The processing status table is used to manage a processing status, a processing page, and a reference storage device for each data processing section.

The processing status indicates whether the analysis processing performed by the data processing section is in execution or on standby. In FIG. 8A to FIG. 8D, "1" indicates being in execution, and "0" indicates being on standby.

The processing page indicates a page number subjected to the analysis processing and the number of pages that form the job data. In FIGS. 8A to 8D, when the number of pages of the job data is 10 and the page number subjected to the analysis processing is "1", the processing page is shown as "1-10", indicating that page one of ten is currently being processed.

The reference storage device indicates an identification number of the storage devices 17 used when the analysis processing is executed and a total number of storage devices 17 that store the spool files. For example, when "1", "2", and "3" are given to the RAM disk 17a, the SSD 17b, and the HDD 17c as the identification numbers of the storage devices 17, the reference storage devices are shown as "1-3", "2-3", and "3-3", respectively; in other words, "1-3" may be read as "device one of three."

At a start time of the page assignment processing, as shown in FIG. 8A, the processing status, the processing page, and the reference storage device are not set.

In step S502, a page given the smallest page number n (the nth page) that is not assigned is assigned to a data processing section 23 on standby, and the procedure advances to step S503.

In step S503, as shown in, for example, FIG. 8B, the processing page corresponding to the data processing section 23 on standby is rewritten to the page number assigned in step S502. Then, the processing status table is updated. In the case of FIG. 8B, the first page of the job data out of 10 pages is assigned to the first data processing section.

When step S503 is completed, the procedure advances to step S504.

In step S504, the storage device from the plurality of storage devices 17 is assigned to the data processing section 23 to which the page has been assigned. At this time, in the processing status table, the reference storage device is updated as shown in, for example, FIG. 8C. In the case of FIG. 8C, the reference storage device for the first data processing section is updated to "1-3". The processing of step S504 is described later in detail.

When step S504 is completed, the procedure advances to step S505.

In step S505, an instruction to start the analysis processing is output to the data processing section 23 to which the page number and the storage device from the plurality of storage devices 17 have been assigned.

The processing status of the data processing section 23 to start the analysis processing may be updated from "0" to "1" in the processing status table, as shown in FIG. 8D. In the case of FIG. 8D, the processing status of the first data processing section is updated from "0" to "1".

When step S505 is completed, the procedure advances to step S506.

In step S506, it is determined whether or not a value of the page number n assigned in step S502 is equal to the number of pages (total number of pages) that form the job data.

If the value of n is smaller than the total number of pages (No), the procedure returns to step S501, and the subsequent processing is repeated. With this loop, the page to be processed and the storage device from the plurality of storage devices 17 are assigned, in order, to all the data processing sections 23 that are standing by for the analysis processing.

On the other hand, if the value of n is equal to the total number of pages (Yes), the page assignment processing is brought to an end.

Figure 9:
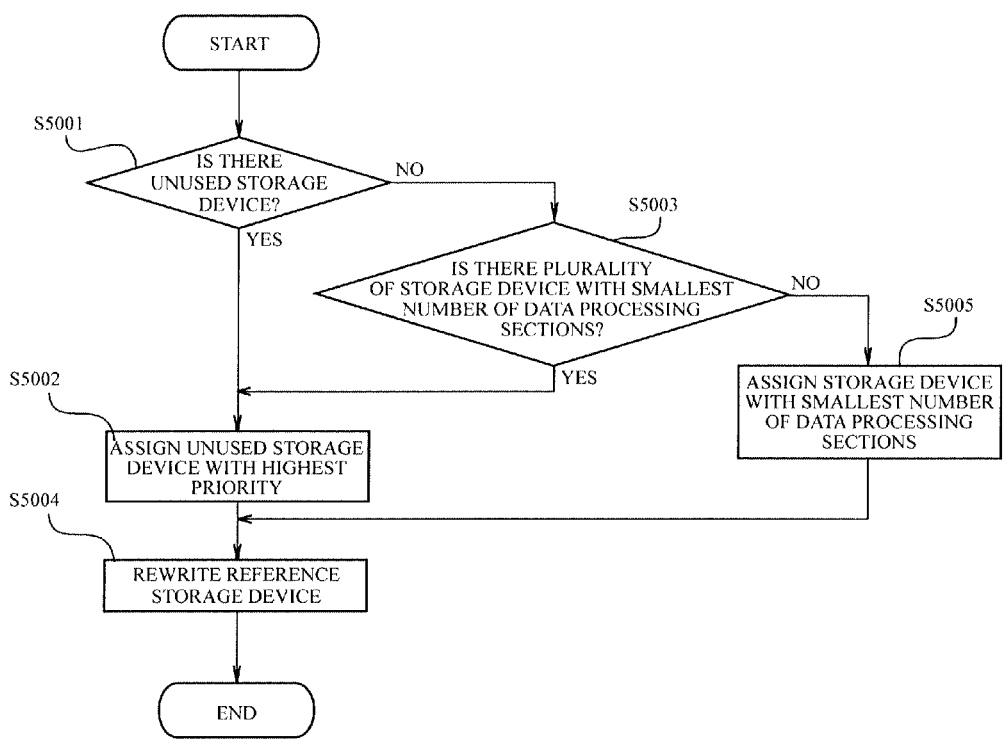
FIG. 9 illustrates a procedure for allocation processing for a storage device illustrated in FIG. 7.

FIG. 9 illustrates a procedure for allocation processing for the storage device illustrated in FIG. 7.

In the assignment processing for the storage device, first in step S5001, with reference to the processing status table, it is determined whether or not there is a storage device from the plurality of storage devices 17 that is not set to be used for the execution of the analysis processing (an unused storage device). The determination is performed in step S5001 for the storage devices 17 that store the spool files.

If there is an unused storage device from the plurality of storage devices 17 (Yes), the procedure advances to step S5002. If there is no unused storage device from the plurality of storage devices 17 (No), the procedure advances to step S5003.

In step S5002, with reference to the priority table, the unused storage device from the plurality of storage devices 17 that has the highest priority is assigned to the data processing section 23.

For example, if all the storage devices 17 are unused, the RAM disk 17a having the priority of "1" in the priority table shown in FIG. 3 is assigned to the data processing section 23 that processes the first page.

When step S5002 is completed, the procedure advances to step S5004.

On the other hand, in step S5003, the storage device from the plurality of storage devices 17 having the smallest number of data processing sections 23 assigned thereto is first identified from among those storing the spool files. Subsequently, in step S5003, it is determined whether or not there are two or more identified storage devices 17.

If the number of identified storage devices 17 is greater than or equal to two (Yes), the procedure advances to step S5002. If the number of identified storage devices 17 is one (No), the procedure advances to step S5005.

In step S5002 that follows step S5003, with reference to the priority table, the storage device 17 given the highest priority is assigned to the data processing section 23 from among those having the smallest number of data processing sections 23 assigned to them.

For example, in the case of using the priority table shown in FIG. 3, when one data processing section 23 that processes first to third pages is assigned to each of the storage devices 17, the RAM disk 17a having the priority of "1" is assigned to the data processing section 23 that processes the fourth page.

In step S5005, the storage device from the plurality of storage devices 17 having the smallest number of data processing sections 23 assigned to it is assigned to the data processing section 23 on standby as one that is used when the analysis processing is executed.

For example, in the case of using the priority table shown in FIG. 3, when one data processing section 23 that processes the first to second pages, the third to fourth pages, and the fifth page is assigned to the RAM disk 17a, the SSD 17b, and HDD 17c respectively, the HDD 17c having the priority of "3" is assigned to the data processing section 23 that processes the sixth page.

When step S5005 is completed, the procedure advances to step S5004.

In step S5004, the reference storage device within the processing status table for the data processing section 23 is reconfigured to indicate the storage device assigned in step S5002 or S5005. Then the processing status table is updated. When step S5004 is completed, the assignment processing for the storage device is brought to an end.

FIG. 10 shows an example of the processing status table where the processing pages and the reference storage devices are set for the first to third data processing sections 23.

In the processing status table, the first page of ten pages and the storage device from the plurality of storage devices 17 whose identification number is "1" (for example, RAM disk 17a) are assigned to the first data processing section as the processing page and the reference storage device, respectively. In the same manner, the second page of the 10 pages and the storage device from the plurality of storage devices 17 whose identification number is "2" (for example, SSD 17b) are assigned to the second data processing section, and the third page of the ten pages and the storage device from the plurality of storage devices 17 whose identification number is "3" (for example, HDD 17c) are assigned to the third data processing section.

The pages assigned in this manner are subjected to the analysis processing by the respective data processing sections 23 to allow the analysis processing of the different pages for the job data within the plurality of storage devices 17 in parallel.

FIG. 11 is a conceptual diagram illustrating processing time required for the analysis processing, according to the first embodiment. FIG. 12 is a conceptual diagram according to a comparative example. FIG. 11 and FIG. 12 illustrate examples where the job data of five pages is stored on the first to third storage devices 17 and subjected to the analysis processing by three data processing sections 23 in parallel.

Note that, the first to third storage devices 17 referred to here are different from the first to third storage devices shown in FIGS. 8A to 8D and FIG. 10.

In FIG. 11 and FIG. 12, storage statuses of the job data on the respective storage devices 17 and their transfer rates are presented in upper rows, and the storage devices to which the respective pages are assigned are presented in a bottom row.

The transfer rates in the upper rows are indicated as "1", "1.4", and "1.2" for the first to third storage devices, respectively, and indicate that the second and third storage devices increase in processing time by 40% and 20%, respectively, relative to the first storage device. Note that these percentages of an increase in processing time are only examples and may vary among specific implementations.

Further, spaces in the bottom row indicate a guide for processing time specific to only the analysis processing. In the examples of FIG. 11 and FIG. 12, it is assumed that, when processed by the first storage device, the first to fifth pages take processing times of eight spaces, ten spaces, twelve spaces, fourteen spaces, and sixteen spaces, respectively. Note that the spaces represent an arbitrary unit of time and do not necessarily correlate to any specific unit of time.

In the first embodiment of FIG. 11, by taking the transfer time into consideration as described above, the first page and the fourth page are assigned to the job data on the first storage device having the highest transfer rate, the second page and the fifth page are assigned to the job data on the third storage device having the next highest transfer rate, and only the third page is assigned to the job data on the second storage device having the lowest transfer rate.

The analysis processing of those pages is performed in parallel, and hence the processing time for all the pages is 31.2 spaces in this example, which is equivalent to the longest analysis processing time taken by the third storage device.

On the other hand, in the comparative example of FIG. 12, simply without taking the transfer time into consideration, the first page and the fourth page are assigned to the job data on the first storage device, the second page and the fifth page are assigned to the job data on the second storage device, and only the third page is assigned to the job data on the third storage device.

In the comparative example, the processing time for all the pages is 36.4 spaces in this example, which is equivalent to the analysis processing time taken by the second storage device.

As is apparent from the above-mentioned results, according to the first embodiment, it is possible to achieve reduction in the processing time by approximately 14%. Note that this reduction in processing time is merely an example; the reduction in processing time may vary depending on a particular implementation having specific storage devices of specific transfer rates.

The image forming apparatus 1 according to the first embodiment includes the data storage section 21 that stores the same job data of the plurality of pages onto the plurality of storage devices 17. The image forming apparatus 1 according to the first embodiment also includes the plurality of data processing sections 23 that process the different pages assigned to the job data within the plurality of storage devices 17 in parallel. The image forming apparatus 1 according to the first embodiment further includes the assignment section 25 that assigns the page to be processed in the parallel processing to the data processing section 23 in accordance with the transfer rates of the storage devices 17 for each piece of job data within the plurality of storage devices 17.

As a result, according to the first embodiment, the page to be processed can be appropriately assigned to the data processing section 23 in accordance with the transfer rates of the storage devices 17 for each piece of job data within the plurality of storage devices 17. Thus, the processing time can be reduced for the parallel processing.

Further, according to the first embodiment, the assignment section 25 preferentially assigns the job data within the storage device having the high transfer rate, and hence it is possible to further reduce the processing time taken for the parallel processing.

In addition, according to the first embodiment, by taking the transfer rates of the storage devices 17 into consideration, it is possible to select a combination of page assignments that brings the processing to an end quickly. In addition, the processing time can be reduced for the parallel processing.

For example, when a change is made in FIG. 11 so that the second page and the fifth page are assigned to the first storage device and the first page and the fourth page are assigned to the third storage device, the assignment of pages that brings the processing to an end earlier, and thus reduces the overall processing time, can be obtained in consideration of the transfer rates of the storage devices 17.

Further, in the first embodiment, the image forming apparatus 1 includes the table creation section 27 that acquires the transfer rate information on the available storage device from the plurality of storage devices 17 and creates the priority table where a higher priority is given to the storage device having the higher transfer rate, the assignment section 25 performs the assignment in accordance with the priority within the priority table.

As a result, according to the first embodiment, the page to be processed can be optimally assigned to the data processing section 23 for each piece of job data within the storage device from the plurality of storage devices 17 in accordance with the transfer rates of the storage devices 17 based on the priority table.

In addition, when the priority table is created, the storage device available at that point in time and the transfer rate information thereon can be obtained, and hence the page can be more optimally assigned.

In the first embodiment, the image forming apparatus 1 includes the rate information retaining section 29 that retains the transfer rate information on the storage device from the plurality of storage devices 17 and the rate measuring section 31 that measures the transfer rate of the storage device from the plurality of storage devices 17 whose transfer rate information is not retained. The table creation section 27 creates the priority table from the transfer rate information within the rate information retaining section 29 and the transfer rate information measured by the rate measuring section 31.

Accordingly, the priority table can be created based on the transfer rate information on all the available storage devices 17, and it is possible to more optimally assign the page corresponding to the transfer rates of the storage devices 17.

II. Second Embodiment

Figure 13:
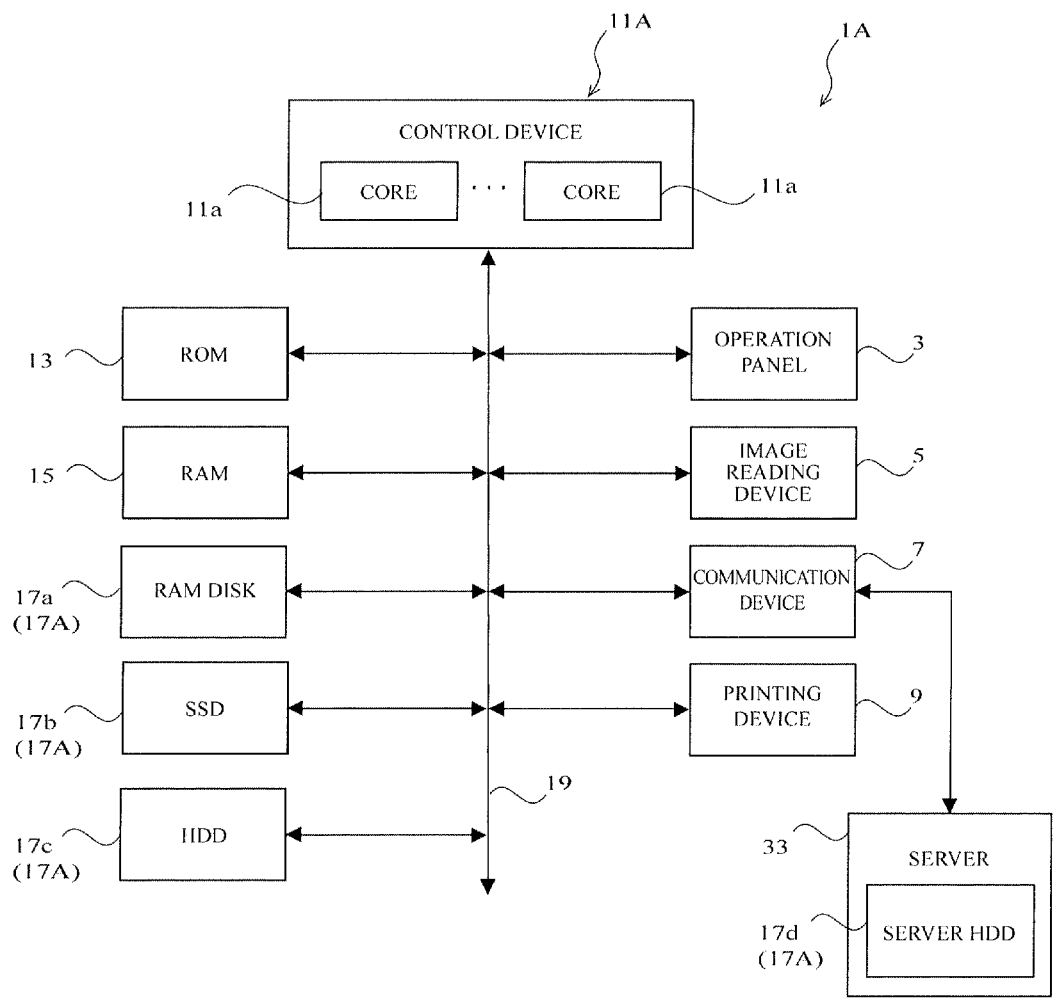
FIG. 13 illustrates a configuration of an image forming apparatus according to a second embodiment of the present disclosure.

FIG. 13 illustrates a configuration of an image forming apparatus according to a second embodiment of the present disclosure. Note that, in the second embodiment, components corresponding to those of the first embodiment are denoted by the same reference symbols or the same reference symbols with the suffix A, and duplicate descriptions of those components are omitted. Further, a control device 11A according to the second embodiment has the same function blocks as those of the first embodiment, and is therefore described with reference to FIG. 2.

As illustrated in FIG. 13, an image forming apparatus 1A according to the second embodiment is connected to a server 33 via the network, and includes a plurality of storage devices 17A including a server HDD 17d provided within the server 33. The server HDD 17d is a nonvolatile storage medium that can be read to and written from within the server 33, and is provided to a control board or the like of the server 33 in a nonremovable manner.

In the second embodiment, the assignment section 25 assigns a page to be processed to the page processing section 23 for each piece of job data within the storage devices 17A including the server HDD 17d. In the same manner as in the first embodiment, the priority table created by the table creation section 27 is used for the assignment.

The table creation section 27 creates the priority table based on the transfer rate information acquired from the rate information retaining section 29 and the rate measuring section 31.

In the same manner as in the first embodiment, the rate information retaining section 29 retains known transfer rates of the RAM disk 17a, the SSD 17b, the HDD 17c, and the like included in the plurality of storage devices 17A as the program data.

In the analysis processing, the rate measuring section 31 measures the transfer rate of each storage device from the plurality of storage devices 17A whose transfer rate information is not retained. In the second embodiment, an unknown transfer rate of the server HDD 17d newly connected through the network is measured in addition to the newly-connected external storage medium such as a USB flash memory device.

The transfer rate of the server HDD 17d is measured as the transfer rate based on a combination of protocols for the server HDD 17d and the server 33. In other words, the transfer rate of the server HDD 17d is measured as the transfer rate obtained when a specific protocol is used for the server HDD 17d. The measured transfer rate is stored in the nonvolatile storage device from the plurality of storage devices 17A that stores the transfer rates, such as the SSD 17b or the HDD 17c along with a server name and an IP address.

The table creation section 27 creates the priority table based on the transfer rates obtained from the rate information retaining section 29 and the rate measuring section 31. FIG. 14 shows an example of a priority table according to the second embodiment of the present disclosure.

As shown in FIG. 14, in the priority table according to the second embodiment, the priorities corresponding to the transfer rates are given to the storage devices 17A. The transfer rate information on the server HDD 17d (Server HDD) also includes information about whether or not a network connection is present, the server name, the IP address, and the protocol. In the example shown in FIG. 14, the protocol for the server HDD 17d is set as a server message block (SMB).

The image forming apparatus 1A according to the second embodiment performs the same processing as in the first embodiment, differs from the first embodiment in the creation processing for the priority table.

Figure 15:
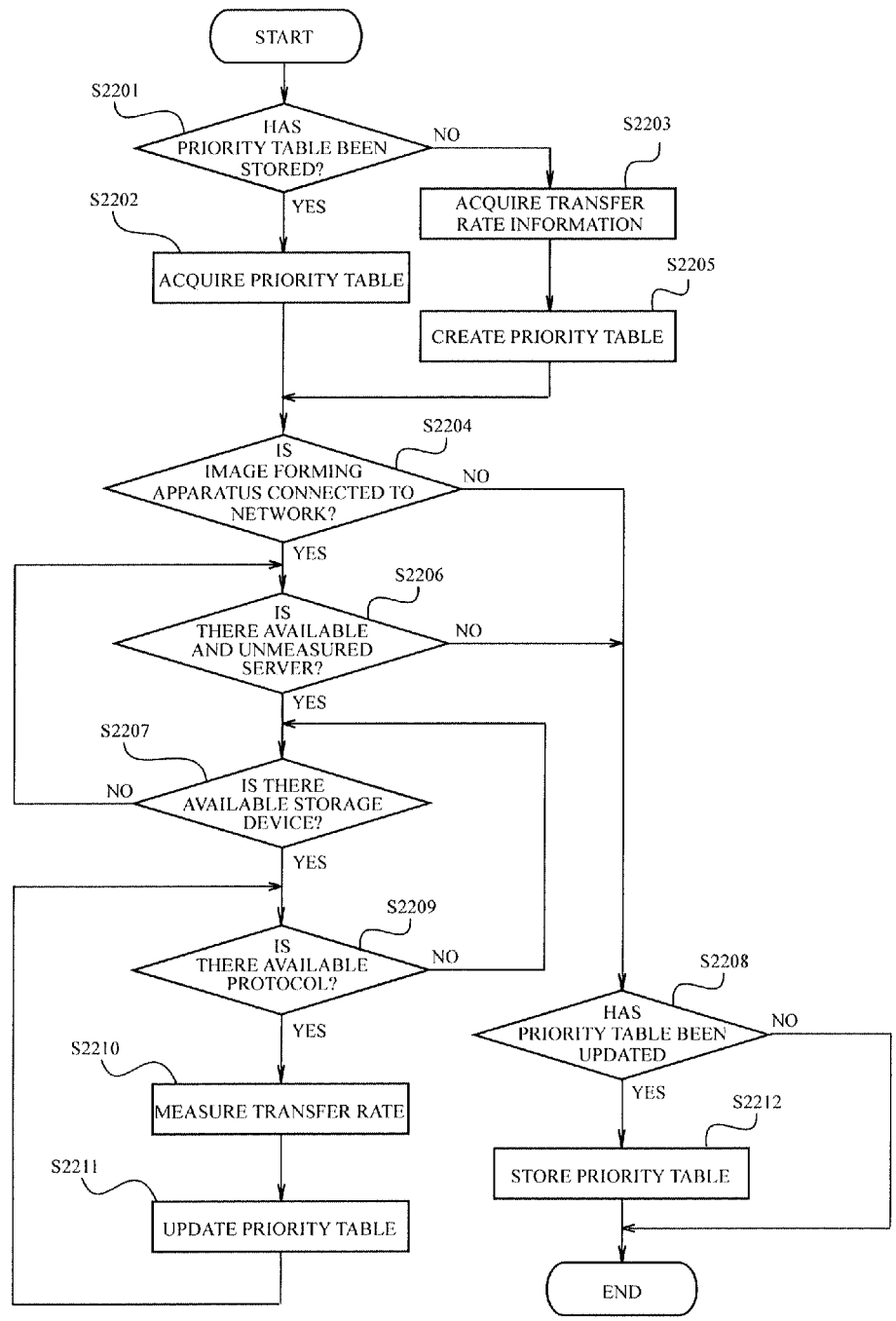
FIG. 15 illustrates a procedure for creation processing for the priority table according to the second embodiment of the present disclosure.

FIG. 15 illustrates the procedure for the creation processing for the priority table according to the second embodiment of the present disclosure. Note that, in a flowchart illustrated in FIG. 15, steps S2201, S2202, S2203, and S2205 are similar to steps S201, S202, S203, and S205 of the flowchart illustrated in FIG. 5, respectively.

That is, in the creation processing of the priority table, the priority table is acquired through the steps S2201, S2202, S2203, and S2205. The creation of the priority table begins at step S2204.

In step S2204, the table creation section 27 detects whether or not the image forming apparatus 1A is connected to the network. The detection can be performed by, for example, acquiring information from the communication device 7.

If the image forming apparatus 1A is connected to the network (Yes), the procedure advances to step S2206, and otherwise (No), the procedure advances to step S2208.

In step S2206, the table creation section 27 first determines whether or not there is a server 33 available on the network. The determination can be performed in step S2206 by, for example, acquiring information from the communication device 7.

If there is an available server 33, the table creation section 27 determines whether or not the transfer rate of the server 33 is unmeasured. The determination can be performed based on the information within the SSD 17b or the HDD 17c. Specifically, the table creation section 27 performs the determination based on the priority table acquired from the SSD 17b or the HDD 17c in step S2202.

If there is an available server 33 whose transfer rate is unmeasured (Yes), the procedure advances to step S2207, and otherwise (No), the procedure advances to step S2208.

In step S2207, the table creation section 27 determines whether or not there is an available storage device from the plurality of storage devices 17A (here, server HDD 17d) on the available server 33 whose transfer rate is unmeasured. If there is an available storage device 17A, the table creation section 27 determines whether or not the transfer rate of the storage device from the plurality of storage devices 17A is unmeasured based on the priority table.

If there is an available storage device 17A whose transfer rate is unmeasured (Yes), the procedure advances to step S2209, and otherwise (No), the procedure returns to step S2206.

In step S2009, it is determined whether or not there is an available protocol for the available server 33 whose transfer rate is unmeasured. If there is an available protocol, the table creation section 27 determines whether or not the transfer rate of the available protocol is unmeasured based on the priority table.

If there is an available protocol whose transfer rate is unmeasured (Yes), the procedure advances to step S2210, and otherwise (No), the procedure returns to step S2207.

In step S2210, the rate measuring section 31 measures the transfer rate based on a combination of the available server HDD 17d and protocol whose transfer rates are unmeasured.

The measured transfer rate is stored on the nonvolatile storage device from the plurality of storage devices 17A such as the SSD 17b or the HDD 17c along with the server name and the IP address.

When step S2210 is completed, the procedure advances to step S2211.

In step S2211, the table creation section 27 updates the priority table based on the transfer rate of the server 33 measured by the rate measuring section 31, and the procedure returns to step S2209. After that, the processing is repeated, and the procedure finally advances to step S2208 through step S2206 and step S2207.

In step S2208, the table creation section 27 determines, based on the information within the nonvolatile storage device from the plurality of storage devices 17A, whether or not the priority table has been updated.

If the priority table has been updated (Yes), the procedure advances to step S2212. If the priority table has not been updated (No), the creation processing for the priority table is brought to an end.

In step S2212, the table creation section 27 stores the priority table updated through the above-mentioned steps into the nonvolatile storage device from the plurality of storage devices 17A.

Next, the creation processing of the priority table is normally brought to an end.

Note that, after the creation processing of the priority table according to the second embodiment is brought to an end, if the procedure advances to step S204 illustrated in FIG. 5 according to the first embodiment, it is possible to create a priority table that covers all the storage devices 17A that are available on the image forming apparatus 1A.

The second embodiment may produce the same operational effects as those of the first embodiment.

In addition, according to the second embodiment, the assignment of pages can be appropriately performed in accordance with the transfer rates of the storage devices 17A while the server HDD 17d within the server 33 connected through the network is also used as the storage device from the plurality of storage devices 17A.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
    a data storing unit configured to store data of a plurality of pages onto a plurality of storage devices;
    a plurality of data processing units configured to perform parallel processing on the data of the plurality of pages, wherein the data for each of the pages is assigned to one of the plurality of data processing units;
    an assignment unit configured to assign the data of each of the pages to be processed by one of the plurality of data processing units, wherein the assignment of the data of each of the pages to one of the plurality of data processing units is determined by a transfer rate of each of the storage devices for the data of the plurality of pages stored on the plurality of storage devices; and
    a table creation unit configured to acquire the transfer rates of each of the storage devices and create a priority table, wherein a priority for each of the storage devices is determined in descending order of the transfer rates of the plurality of storage devices,
    wherein the assignment unit is further configured to assign the data of each of the pages to the plurality of data processing units based on the priority of each of the storage devices within the priority table.

2. The image forming apparatus according to claim 1, further comprising:
    a rate information retaining unit configured to retain the transfer rates of the plurality of storage devices; and
    a rate measuring unit configured to measure the transfer rate of each of the storage devices,
    wherein the table creation unit is further configured to create the priority table from the transfer rates retained in the rate information retaining unit and the transfer rates measured by the rate measuring unit.

3. The image forming apparatus according to claim 1, wherein:
    the plurality of storage devices includes a server connected to a network, wherein the server includes a server storage unit; and the assignment unit is further configured to assign the data of the plurality of pages stored on the server storage unit to the plurality of data processing units, wherein the assignment of the data of each of the pages stored on the server storage unit is determined using a server transfer rate, wherein the server transfer rate is based on a combination of protocols used by the server storage unit and the server.

4. A non-transitory computer-readable recording medium storing an image processing program executable by a computer of an image processing apparatus, wherein the image processing program comprises:
   a first program code that causes the computer to store data of a plurality of pages onto a plurality of storage devices;
   a second program code that causes the computer to realize a plurality of data processing functions that perform parallel processing on the data of the plurality of pages, wherein the data of each of the plurality of pages is assigned to one of the plurality of data processing functions; and
   a third program code that causes the computer to assign the data of each of the pages to be processed in parallel by one of the plurality of data processing functions, wherein the assignment of the data of each of the pages to be processed in parallel by one of the plurality of data processing functions is determined by a transfer rate of each of the storage devices for the data of the plurality of pages stored on the plurality of storage devices; and
   a fourth program code that causes the computer to acquire the transfer rates of each of the storage devices and create a priority table, wherein a priority for each of the storage devices is determined in descending order of the transfer rates of the plurality of storage devices,
   wherein the third program code causes the computer to assign the data of each of the pages to the plurality of data processing functions based on the priority of each of the storage devices within the priority table.

5. The non-transitory computer-readable recording medium according to claim 4, the image processing program further comprising:
   a fifth program code that causes the computer to retain the transfer rates of the plurality of storage devices; and
   a sixth program code that causes the computer to measure the transfer rate of each of the storage devices; and
   the fourth program code further causes the computer to create the priority table from the transfer rates retained by the fifth program code and the transfer rates measured by the sixth program code.

6. The non-transitory computer-readable recording medium according to claim 4, wherein:
   the plurality of storage devices includes a server connected to a network, wherein the server includes a server storage unit; and
   the third program code further causes the computer to assign the data of the plurality of pages stored on the server storage unit to the plurality of data processing functions, wherein the assignment of the data of the plurality of pages stored on the server storage unit is determined using a server transfer rate, wherein the server transfer rate is based on a combination of protocols used by the server storage unit and the server.

7. An image forming method, comprising:
   storing, via a data storage unit, data of a plurality of pages onto a plurality of storage devices;
   performing, via a plurality of data processing units, parallel processing on the data of the plurality of pages, wherein the data for each of the pages is assigned to one of the plurality of data processing units;
   assigning, via an assignment unit, the data of each of the pages to be processed by one of the plurality of data processing units, wherein the assignment of the data of each of the pages to one of the plurality of data processing units is determined by a transfer rate of each of the storage devices for the data of the plurality of pages stored on the plurality of storage devices; and
   acquiring, via a table creation unit, the transfer rates on each of the storage devices to create a priority table, wherein a priority for each of the storage devices is determined in descending order of the transfer rates of the plurality of storage devices,
   wherein the assignment unit assigns the data of each of the pages to the plurality of data processing units based on the priority of each of the storage devices with the priority table.

8. The image forming method according to claim 7, further comprising:
   retaining, via a rate information retaining unit, the transfer rates of the plurality of storage devices; and
   measuring, via a rate measuring unit, the transfer rate of each of the storage devices,
   wherein the table creation unit creates the priority table from the transfer rates retained in the rate information retaining unit and the transfer rates measured by the rate measuring unit.

9. The image forming method according to claim 7, wherein:
   the plurality of storage devices includes a server connected to a network, wherein the server includes a server storage unit; and
   the assignment unit assigns the data of the plurality of pages stored on the server storage unit to the plurality of data processing units, wherein the assignment of the data of each of the pages stored on the server storage unit is determined using a server transfer rate, wherein the server transfer rate is based on a combination of protocols used by the server storage unit and the server.

* * * * *